US008477715B2

(12) United States Patent
Bahini et al.

(10) Patent No.: US 8,477,715 B2
(45) Date of Patent: Jul. 2, 2013

(54) METHOD AND APPARATUS FOR PERFORMING IP CONFIGURATION AFTER HANDOFF IN WLAN

(75) Inventors: Henri Dagbegnon Bahini, San Diego, CA (US); Amit Gil, San Diego, CA (US); Lalit Yerramilli Raju, San Diego, CA (US); Anup Kuzhiyil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1169 days.

(21) Appl. No.: 11/779,799

(22) Filed: Jul. 18, 2007

(65) Prior Publication Data

US 2008/0019319 A1 Jan. 24, 2008

Related U.S. Application Data

(60) Provisional application No. 60/832,040, filed on Jul. 19, 2006.

(51) Int. Cl.
*H04W 4/00* (2009.01)

(52) U.S. Cl.
USPC .......................................... 370/331; 455/436

(58) Field of Classification Search
USPC ................. 370/229–230, 328–338, 464–467; 709/223–229
See application file for complete search history.

(56) References Cited

U.S. PATENT DOCUMENTS

| | | | |
|---|---|---|---|
| 2002/0136226 A1* | 9/2002 | Christoffel et al. | 370/401 |
| 2005/0080884 A1* | 4/2005 | Siorpaes et al. | 370/466 |
| 2005/0108431 A1* | 5/2005 | Park | 709/245 |
| 2005/0266848 A1* | 12/2005 | Kim | 455/436 |
| 2006/0120171 A1* | 6/2006 | Touati et al. | 365/189.05 |

FOREIGN PATENT DOCUMENTS

| | | |
|---|---|---|
| CN | 1774138 A | 5/2006 |
| JP | 2002374287 A | 12/2002 |
| JP | 2004246751 A | 9/2004 |
| WO | 02077820 | 10/2002 |
| WO | WO2005109768 A1 | 11/2005 |

OTHER PUBLICATIONS

International Search Report—PCT/US07/073929—International Search Authority—European Patent Office—Dec. 17, 2007.
Written Opinion—PCT/US2007/073929, International Search Authority, European Patent Office, Dec. 17, 2007.
Taiwan Search Report—TW096126408—TIPO—Feb. 16, 2012.

* cited by examiner

*Primary Examiner* — Kashif Siddiqui
(74) *Attorney, Agent, or Firm* — Kevin Cheatham

(57) ABSTRACT

Techniques for performing IP configuration after handoff in a WLAN are described. A station associates with a first access point in the WLAN and performs IP configuration to obtain a first set of IP configuration parameters. The station thereafter exchanges data via the first access point using the first set of IP configuration parameters. The station performs handoff from the first access point to a second access point and performs IP configuration after the handoff. While the IP configuration is in progress, the station continues to exchange data via the second access point using the first set of IP configuration parameters. This avoids interruption in IP connectivity. After completing the IP configuration, the station either (i) continues to exchange data using the first set of IP configuration parameters if new parameters are not obtained or (ii) exchanges data using a second set of IP configuration parameters if obtained.

28 Claims, 7 Drawing Sheets

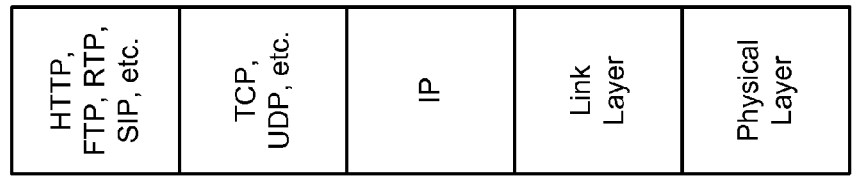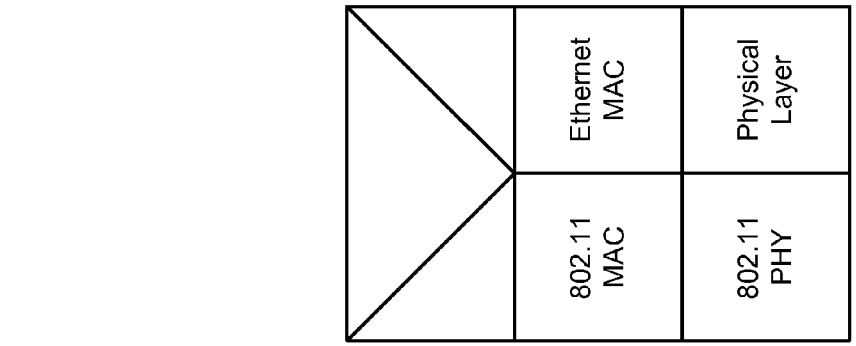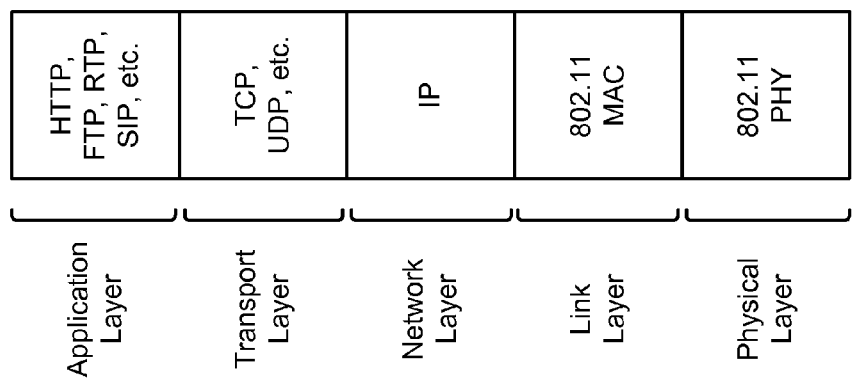
FIG. 2

METHOD AND APPARATUS FOR PERFORMING IP CONFIGURATION AFTER HANDOFF IN WLAN

The present application claims priority to provisional U.S. application Ser. No. 60/832,040, entitled "WLAN HANDOFF OPTIMIZATION," filed Jul. 19, 2006, assigned to the assignee hereof and incorporated herein by reference.

BACKGROUND

I. Field

The present disclosure relates generally to communication, and more specifically to techniques for maintaining Internet Protocol (IP) connectivity for a station in a wireless communication network.

II. Background

Wireless communication networks are widely deployed to provide various communication services such as voice, video, packet data, messaging, broadcast, etc. These wireless networks include wireless wide area networks (WWANs), wireless metropolitan area networks (WMANs), and wireless local area networks (WLANs). The terms "network" and "system" are often used interchangeably.

A user may utilize a station (e.g., a cellular phone) to obtain a desired service such as Voice-over-IP (VoIP) from a wireless network. The user may be mobile, and the station may be handed off from one access point to another access point in the wireless network. After handoff, the station may perform IP configuration to obtain network parameters used to maintain IP connectivity for the station. IP connectivity refers to the ability to send and receive IP packets. The IP configuration may take some amount of time to complete, and data exchanges may be interrupted while the IP configuration is in progress.

SUMMARY

Techniques for efficiently performing IP configuration after handoff in a WLAN are described herein. A station may perform IP configuration in order to obtain IP configuration parameters such as a host IP address, a gateway IP address, a server IP address, and a subnet mask. The station may use the host IP address as its IP address to send and receive packets. The gateway IP address is an IP address of a router to which the station may send packets for forwarding to remote terminals and servers. The server IP address is an IP address of a Dynamic Host Configuration Protocol (DHCP) server that can provide IP configuration parameters for a sub-network (or subnet) in which the station belongs. The subnet mask may be used to determine whether a remote terminal or server is located within or outside of the subnet, which may affect how packets are sent to the remote terminal or server.

The station may associate with a first access point in the WLAN and may perform IP configuration to obtain a first set of IP configuration parameters. The station may thereafter exchange data via the first access point using the first set of IP configuration parameters. The station may perform handoff from the first access point to a second access point. The station may perform IP configuration after the handoff and may request for the same IP address currently used by the station. While the IP configuration is in progress, the station may continue to exchange data via the second access point using the first set of IP configuration parameters. This may avoid interruption in IP connectivity due to WLAN handoff. After completing IP the configuration, the station may either (i) continue to exchange data using the first set of IP configuration parameters if new parameters are not obtained or (ii) exchange data using a second set of IP configuration parameters if obtained. By allowing an active application at the station to exchange data using the first set of IP configuration parameters while the IP configuration via the second access point is in process, handoff time may be effectively reduced from the application's perspective.

Various aspects and features of the disclosure are described in further detail below.

BRIEF DESCRIPTION OF THE DRAWINGS

FIG. 2 shows protocol stacks at various entities in FIG. 1.

DETAILED DESCRIPTION

The techniques described herein may be used for various wireless networks such as WWANs, WMANs, and WLANs. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as cdma2000, Universal Terrestrial Radio Access (UTRA), etc. cdma2000 covers IS-2000, IS-95 and IS-856 standards. UTRA includes Wideband CDMA (W-CDMA) and Low Chip Rate (LCR). A TDMA network may implement a radio technology such as Global System for Mobile Communications (GSM). An OFDMA network may implement a radio technology such as Evolved UTRA (E-UTRA), IEEE 802.20, Flash-OFDM®, etc. A WMAN may implement a radio technology such as IEEE 802.16. A WLAN may implement a radio technology such as IEEE 802.11, Hiperlan, etc. These various radio technologies and standards are known in the art. For clarity, certain aspects of the techniques are described below for a WLAN that implements IEEE 802.11.

Figure 1:
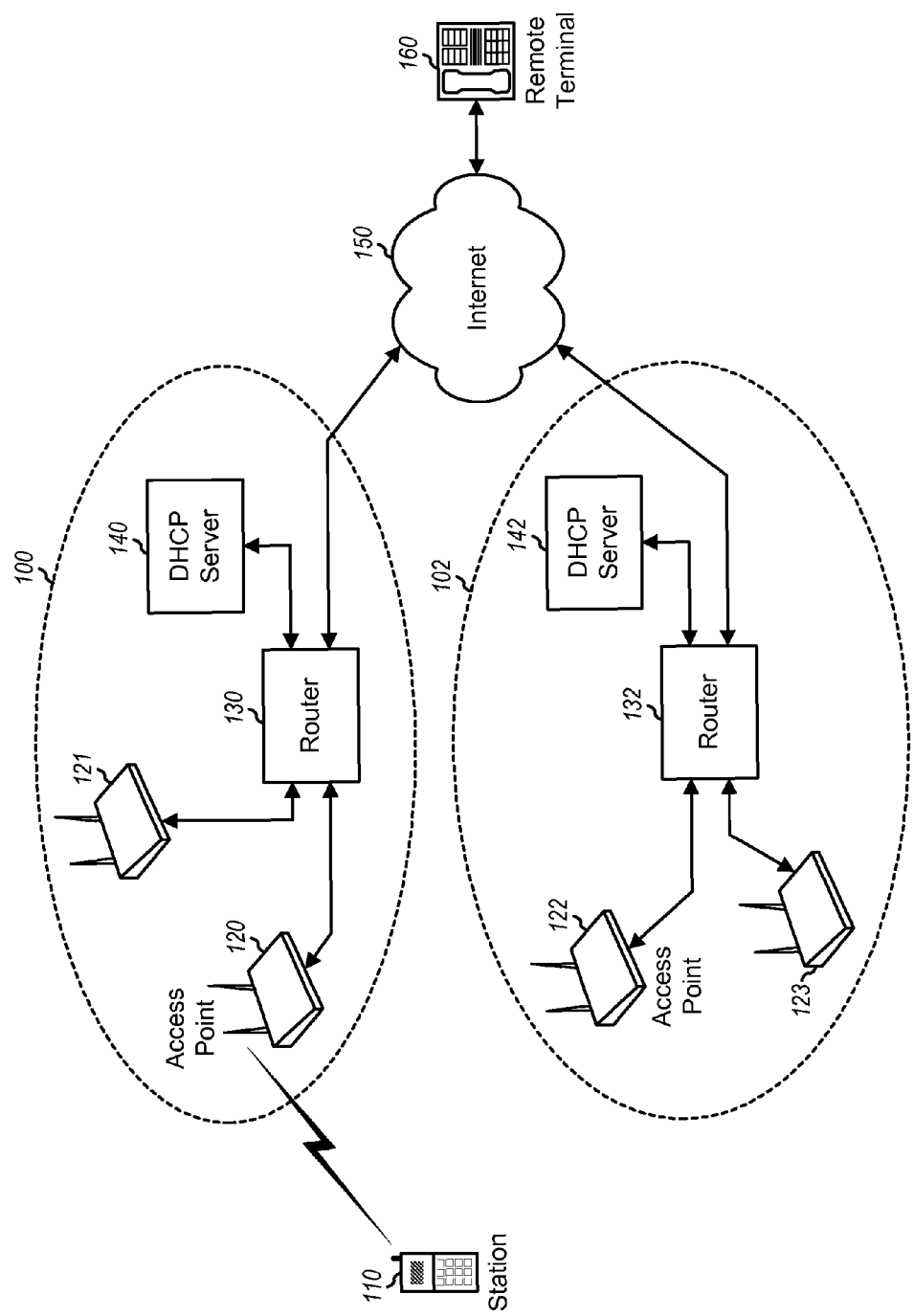
FIG. 1 shows multiple WLAN subnets.

FIG. 1 shows an example deployment of two WLAN subnets 100 and 102. WLAN subnet 100 includes access points 120 and 121, a router 130, and a DHCP server 140. WLAN subnet 102 includes access points 122 and 123, a router 132, and a DHCP server 142. Each access point may provide access to distribution services via the wireless medium/channel for stations associated with that access point. Each router may route packets exchanged between access points and stations in its subnet and external network entities. Each router may also perform translation between private and public IP addresses for the access points and stations within its subnet. Each DHCP server may perform functions to support IP connectivity for the stations in its subnet, e.g., assign IP addresses to stations, provide network configuration parameters, etc. WLAN subnets 100 and 102 may implement any standard in the IEEE 802.11 family of standards.

A station (STA) 110 may communicate with WLAN subnet 100 or 102 to obtain various services such as IP connectivity, VoIP, etc. Station 110 may also be referred to as a mobile station, a user equipment (UE), a terminal, a user terminal, a subscriber unit, etc. Station 110 may be a cellular phone, a personal digital assistant (PDA), a wireless modem, a handheld device, a laptop computer, etc. Station 110 may exchange data with access points in WLAN subnet 100 or 102 for communication with other terminals and servers such as a remote terminal 160. Station 110 may also communicate with a DHCP server to obtain IP configuration parameters used to communicate with other terminals and servers.

WLAN subnets 100 and 102 may include other network entities not shown in FIG. 1. WLAN subnets 100 and 102 may couple directly or indirectly to other networks such as the Internet 150, a Public Switched Telephone Network (PSTN) that serves conventional telephones, etc.

FIG. 2 shows example protocol stacks at various entities in FIG. 1 for communication between station 110 and terminal 160. The protocol stack for each entity may include an application layer, a transport layer, a network layer, a link layer, and a physical layer.

Station 110 may communicate with terminal 160 using HyperText Transfer Protocol (HTTP), File Transfer Protocol (FTP), Real-time Transport Protocol (RTP), Session Initiation Protocol (SIP), and/or other protocols at the application layer. Application layer data may be sent using Transmission Control Protocol (TCP), User Datagram Protocol (UDP), and/or other protocols at the transport layer. These various protocols are known in the art. In general, station 110 may use any IP-based protocol or protocols over IP. Transport layer data may be encapsulated in IP packets, which may be exchanged between station 110 and terminal 160 via access point 120, router 130, and possibly other entities.

Station 110 may communicate with access point 120 via IEEE 802.11 Medium Access Control (MAC) protocol at the link layer and IEEE 802.11 physical layer (PHY). Access point 120 may communicate with router 130 via Ethernet at the link layer and a physical layer. Router 130 may communicate with terminal 160 directly or indirectly via a link layer and a physical layer.

Figure 3:
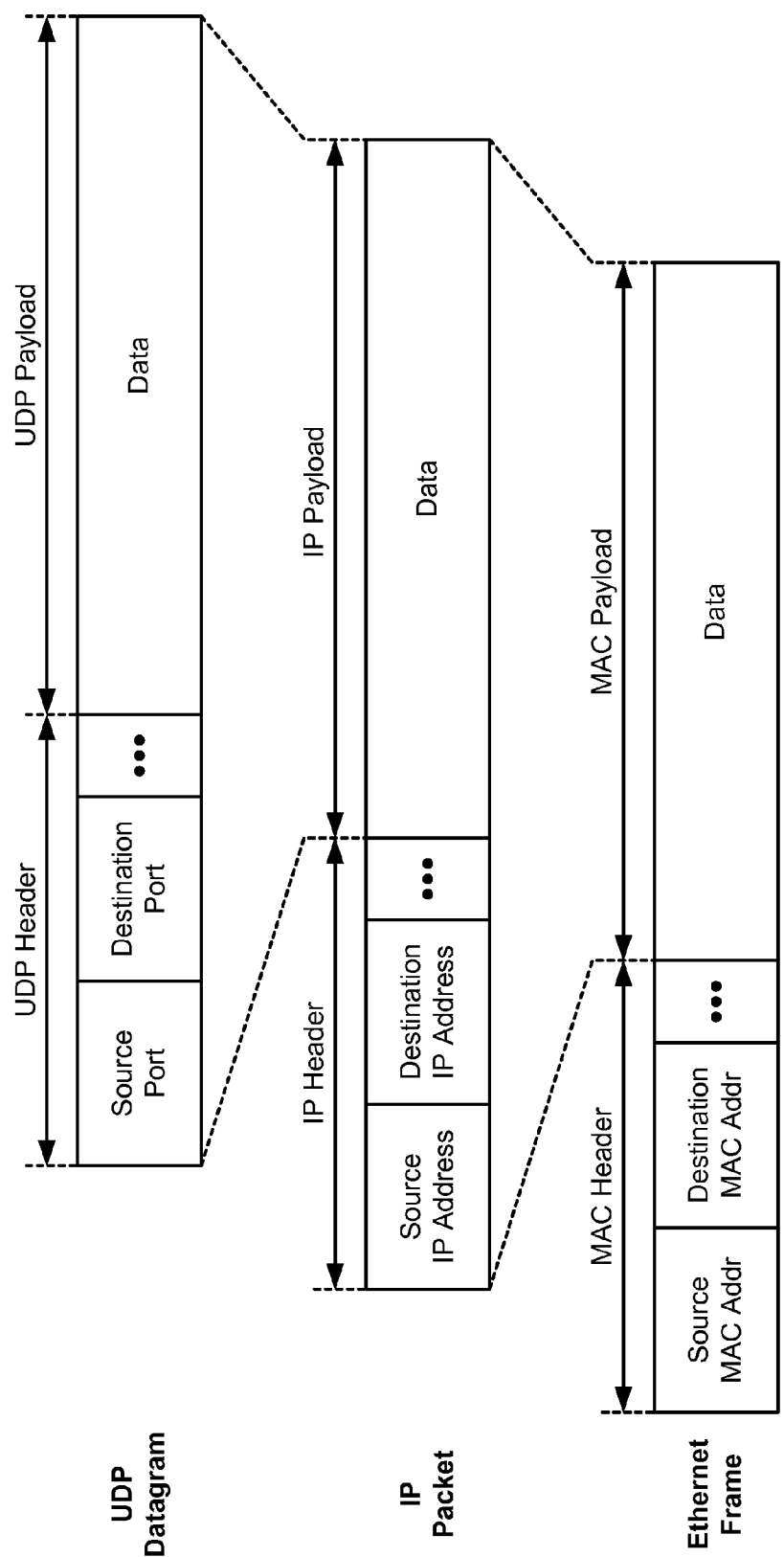
FIG. 3 shows data formats for transport, network, and link layers.

FIG. 3 shows the formats and the encapsulation of data units for the transport, network, and link layers. For UDP at the transport layer, data is sent as UDP datagrams, with each datagram including a UDP header and a UDP payload. The UDP header includes a source port and a destination port, where a port indicates a logical channel associated with the data in the payload. For IP at the network layer, data is sent as IP packets (or datagrams), with each IP packet including an IP header and an IP payload. The IP header includes (i) a source IP address set to an IP address of a sender of the IP packet and (ii) a destination IP address set to an IP address of a recipient of the IP packet. The IP payload may carry a UDP datagram or some other data. For Ethernet at the link layer, data is sent as Ethernet frames, with each frame including a MAC header and a MAC payload. The MAC header includes (i) a source MAC address set to a MAC address of a sender of the Ethernet frame and (ii) a destination MAC address set to a MAC address of a recipient of the Ethernet frame. The MAC payload may carry an IP packet or some other data.

Figure 4:
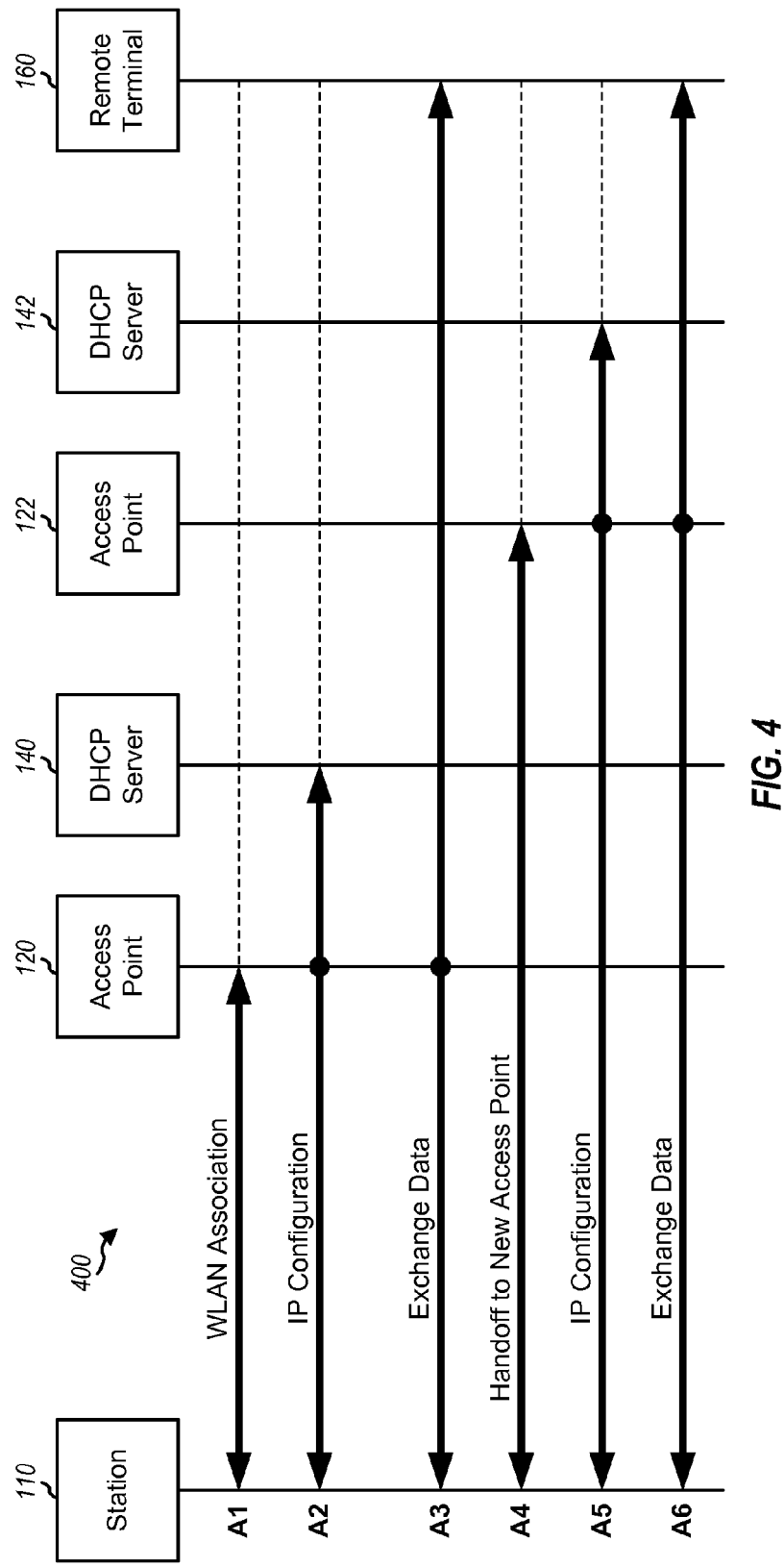
FIG. 4 shows a message flow for communication between a station and a remote terminal.

FIG. 4 shows a message flow 400 for communication between station 110 and terminal 160. FIG. 4 shows data/signaling exchanges between station 110 and access points 120 and 122, DHCP servers 140 and 142, and terminal 160. For simplicity, data/signaling exchanges between entities not directly involving station 110 (e.g., between the access points and routers) are not shown in FIG. 4.

Initially, station 110 may search for WLANs, detect access point 120 in WLAN subnet 100, and associate with access point 120 (step A1). Step A1 may include making signal measurements, reading beacon frames, exchanging probe request/response, performing access and user authentication, and exchanging association request/response with access point 120. Station 110 may then interact with DHCP server 140 to obtain IP configuration parameters used to communicate with other terminals and servers, as described below (step A2). Steps A1 and A2 may be performed when station 110 is powered up, when station 110 moves into a new coverage area, etc.

An application may be launched at station 110 and may desire to communicate with remote terminal 160. Station 110 may perform any necessary setup to allow the application to communicate with remote terminal 160. The setup may be dependent on the application type. As an example, for a VoIP application, station 110 may perform call setup, which may include (i) establishing quality of service (QoS) for RTP and SIP flows for the VoIP call with access point 120 and (ii) establishing an IP Multimedia Subsystem (IMS) session with a Call Session Control Function (CSCF) that supports IMS services such as VoIP. The application may utilize a socket, which is one endpoint of a two-way communication path between two applications running on a network. The socket may be bound to a port number of a transport layer protocol (e.g., UDP or TCP) and an IP address assigned to station 110. The port number may be used by the transport layer protocol to identify data for the application, and the IP address may be used to exchange data for the application. Station 110 may thus map the socket for the application to the assigned IP address. Station 110 may also perform setup to open a connection for the socket. After completing setup, station 110 may exchange data with terminal 160 via access point 120 for the application (step A3).

Station 110 may be mobile and may perform handoff from access point 120 to access point 122 (step A4). Step A4 may include sending a disassociation frame to access point 120, receiving an acknowledgement from access point 120, sending an association request frame to access point 122, and receiving an association response frame from access point 122. Step A4 may also include establishing QoS with access point 122, e.g., for a VoIP call/session. Station 110 may interact with DHCP server 142 to obtain IP configuration parameters, as described below (step A5). Station 110 may thereafter exchange data with terminal 160 via access point 122 (step A6). At some point, station 110 or terminal 160 may terminate the session. Station 110 may exchange signaling with access point 122 and possibly other network entities to terminate the session.

In FIG. 4, each step shown by a double-headed arrow typically involves a set of messages exchanged between at least two entities. Some of these steps may be performed in a manner such that improved performance may be achieved for station 110, as described below.

Station 110 may perform IP configuration whenever it associates with a new access point in order to obtain IP configuration parameters, which may include the following:

Host IP address—an IP address that station 110 can use as its own IP address, if station 110 does not already have an IP address, Gateway IP address—an IP address of a router to which station 110 can send IP packets, Server IP address—an IP address of a DHCP server for the subnet in which station 110 is located, and Subnet mask—a mask used to determine a subnet address of the subnet in which station 110 is located.

Station 110 may use the subnet mask to determine whether a remote terminal is located within or outside of the subnet. Station 110 may send packets directly to the remote terminal if it is located within the subnet and may send packets to the remote terminal via the router if the terminal is located outside of the subnet.

Figure 5:
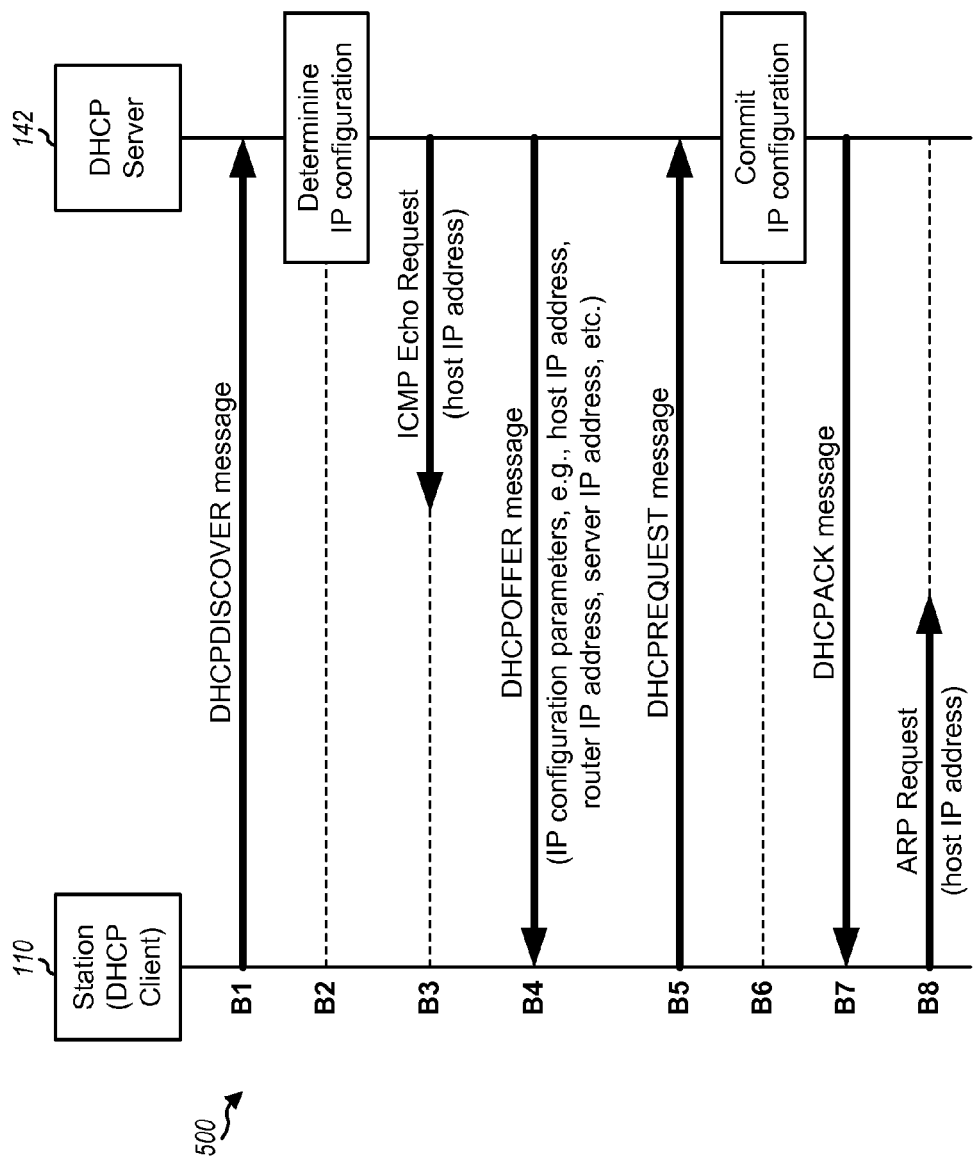
FIG. 5 shows a message flow for IP configuration using DHCP.

FIG. 5 shows a message flow 500 for IP configuration using DHCP. Message flow 500 may be performed for step A2 in FIG. 4 (not shown in FIG. 5) and also for step A5 in FIG. 4 (as shown in FIG. 5).

Station 110 may act as a DHCP client and initiate a DHCP transaction by broadcasting a DHCPDISCOVER message within the subnet (Step B1). The DHCPDISCOVER message may request for an IP address for station 110. For IP configuration in step A2 in FIG. 4, station 110 may not care which IP address is assigned to the station. For IP configuration after handoff to access point 122 in step A5 in FIG. 4, station 110 may request for the same IP address currently used by station 110 in order to avoid disruption of IP connectivity and may include this IP address in the DHCPDISCOVER message. A DHCP message may be sent as a UDP datagram. The source port field in the UDP header may be set to '67' to indicate that the message is from a DHCP server or to '68' to indicate that the message is from a DHCP client. A destination port field in the UDP header may be set to '67' or '68' to indicate that the intended recipient of the message is the DHCP server or DHCP client, respectively.

Upon receiving the DHCPDISCOVER message, DHCP server 142 may determine IP configuration parameters for station 110, e.g., select an IP address to assign to station 110 (step B2). The selected IP address may be the IP address requested by station 110 (if sent in the DHCPDISCOVER message) or some other IP address chosen by DHCP server 142. DHCP server 142 may ensure that no other station is using the selected IP address by broadcasting an Internet Control Message Protocol (ICMP) Echo Request containing the selected IP address (step B3). The ICMP Echo Request asks a station currently using the selected IP address to return an ICMP Echo Reply. DHCP server 142 may wait a particular timeout period for an ICMP Echo Reply. If DHCP server 142 does not receive an ICMP Echo Reply within the timeout period, as expected, then no other station is using the selected IP address, and DHCP server 142 may assign this IP address to station 110. DHCP server 142 may then respond by sending a DHCPOFFER message to station 110 (step B4). The DHCPOFFER message may include the selected IP address as a host IP address, the IP address of router 132 as a gateway IP address, the IP address of DHCP server 142 as a server IP address, a subnet mask, etc.

In a local area network (LAN) environment, multiple DHCP servers may receive a DHCPDISCOVER message broadcast by a station, and the station may receive multiple DHCPOFFER messages from these DHCP servers. The station may then select one of the DHCP servers to request IP configuration parameters. For the WLAN deployment shown in FIG. 1, station 110 may receive a DHCPOFFER message from only DHCP server 142 after the handoff to access point 122. Station 110 may then send a DHCPREQUEST message, which may identify DHCP server 142 and include the host IP address and the server IP address sent in the DHCPOFFER message (step B5). DHCP server 142 may receive the DHCPREQUEST message from station 110 and commit the IP configuration parameters, e.g., the host IP address (step B6). DHCP server 142 may then return a DHCPACK message containing the IP configuration parameters (step B7).

Station 110 may also ensure that no other station is using the host IP address received from DHCP server 142 by broadcasting an Address Resolution Protocol (ARP) Request containing the host IP address (step B8). The ARP Request asks a station currently using the host IP address to reply with its MAC address. Station 110 may wait a particular timeout period for an ARP Reply. If station 110 does not receive an ARP Reply within the timeout period, as expected, then station 110 may use this IP address to exchange IP packets. Station 110 may thereafter use the IP configuration parameters for data exchanges with terminal 160 (step A6 in FIG. 4). Upon termination of the session or after being handed off to another access point, station 110 may relinquish the host IP address by sending a DHCPRELEASE message to DHCP server 142 (not shown in FIG. 5). The procedure for IP configuration via DHCP is described in a document RFC 2131, entitled "Dynamic Host Configuration Protocol," which is publicly available.

As shown in FIG. 4, station 110 may be handed off from one access point to another access point during a session. It is desirable to reduce the amount of time to handoff from one access point to another. As shown in FIG. 5, one component of handoff that may take a significant amount of time is IP configuration via DHCP. Station 110 typically has no way to determine whether the new access point is served by the same DHCP server that serves the old access point or by another DHCP server. Station 110 may thus perform IP configuration after handoff, as shown in FIG. 5, in order to obtain IP configuration parameters for the new access point. Station 110 may send a notification to the active application(s) at station 110 prior to starting IP configuration. The active application(s) may temporarily halt data exchanges while IP configuration is in progress. However, this temporarily halt may interrupt the pending session and may thus be undesirable.

In an aspect, station 110 may perform IP configuration after handoff from one access point to another access point but may allow the active application(s) to exchange data using the IP configuration parameters obtained via the old access point while the IP configuration via the new access point is in process. This may effectively reduce handoff time from the perspective of the active application(s).

Figure 6:
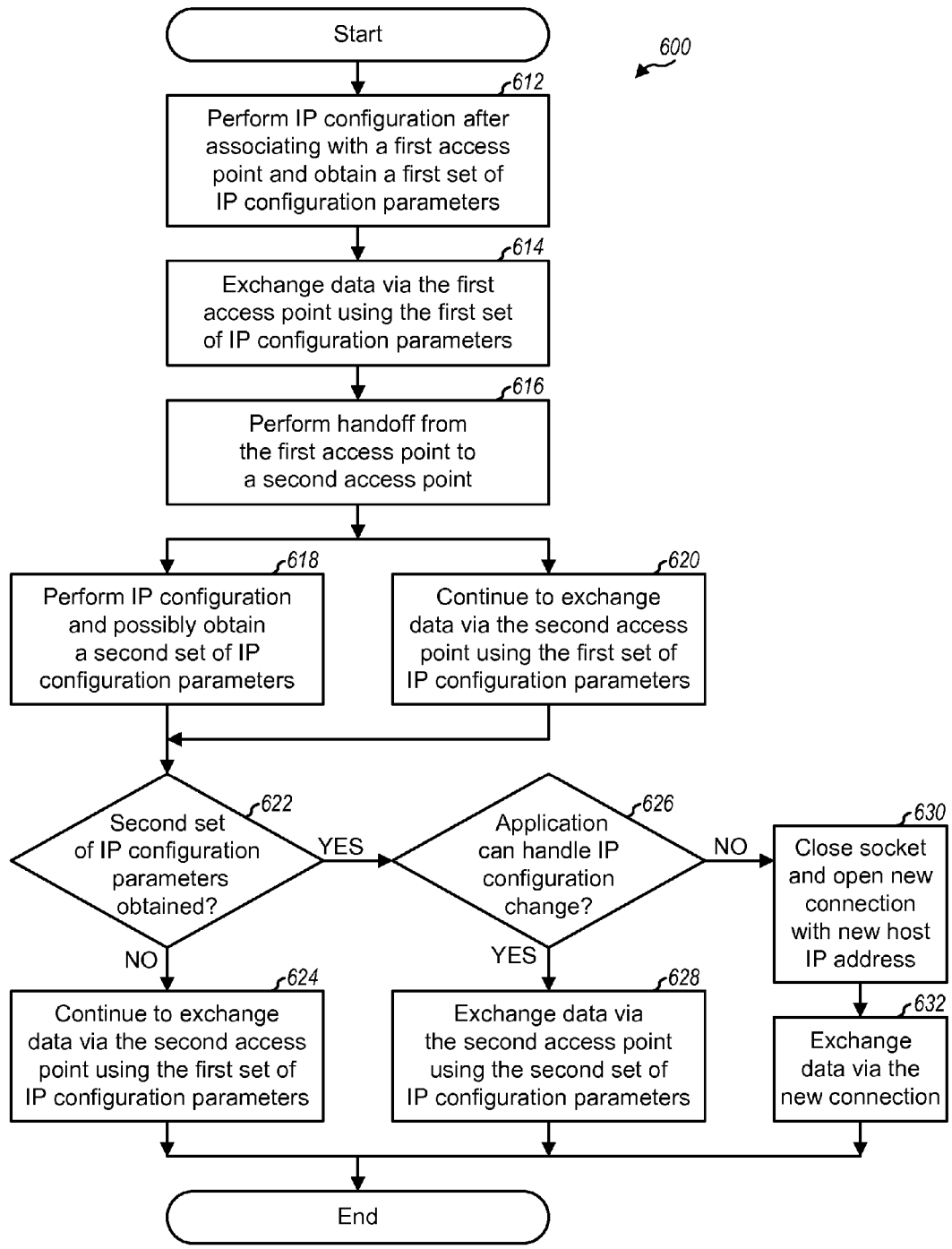
FIG. 6 shows a process for communication with efficient IP configuration after handoff in WLAN.

FIG. 6 shows a design of a process 600 for communication with efficient IP configuration after handoff in WLAN. Initially, station 110 may associate with a first access point, e.g., access point 120 in FIG. 1, and may perform IP configuration to obtain a first set of IP configuration parameters (block 612). Station 110 may thereafter exchange data via the first access point using the first set of IP configuration parameters (block 614). Station 110 may perform handoff from the first access point to a second access point, e.g., access point 122 in FIG. 1 (block 616). Station 110 may perform IP configuration after associating with the second access point and may or may not obtain a second set of IP configuration parameters (block 618). For the IP configuration in block 618, station 110 may request for the same IP address currently used by station 110. While the IP configuration is in progress in block 618, station 110 may continue to exchange data via the second access point using the first set of IP configuration parameters (block 620). Station 110 may use the host IP address and gateway IP address from the first set of IP configuration parameters to exchange data via the second access point.

After completing IP configuration in block 618, station 110 may determine whether or not a second set of IP configuration parameters was obtained (block 622). If new IP configuration parameters were not obtained ('No' for block 622), then station 110 may continue to exchange data via the second access point using the first set of IP configuration parameters (block 624). If new IP configuration parameters were obtained ('Yes' for block 622), then station 110 may determine whether the active application(s) can handle a change in IP configuration, e.g., a new host IP address (block 626). For example, UDP-based applications may be able to handle a change of host IP address. For each active application that can handle an IP configuration change, station 110 may apply the second set of IP configuration parameters and, from this point onward, exchange data for this application via the second access point using the second set of IP configuration parameters (block 628). For each active application that cannot handle an IP configuration change, station 110 may perform appropriate action, e.g., close the socket for the application and open a new connection with the new host IP address (block 630). Station 110 may then exchange data for the application via the new connection (block 632).

As shown in FIG. 6, station 110 may seamlessly maintain IP connectivity and communication with terminal 160 even with the handoff from the old/first access point to the new/second access point. IP connectivity may be maintained (i) when new IP configuration parameters are not obtained after the handoff, e.g., because the same DHCP server serves both the old and new access points, and (ii) when an active application can handle a change in IP configuration. From an application's perspective, handoff time may be reduced since the application does not need to wait for completion of IP configuration in order to exchange data. If new IP configuration parameters are obtained and the application cannot handle a change in IP configuration, then station 110 may close the socket and open a new connection with the new host IP address, which may be no worse than suspending the application during the IP configuration after the handoff.

FIGS. 4 and 6 show station 110 performing IP configuration after handoff from old/first access point 120 to new/second access point 122. In another design, after handoff, station 110 may start the IP configuration process by broadcasting a DHCPDISCOVER message via new access point 122. Station 110 may then determine whether a DHCPOFFER message is received from DHCP server 140, which serves old access point 120. If both access points 120 and 122 are served by the same DHCP server, which may be determined based on the server IP address in the DHCPOFFER message being the same as the IP address of DHCP server 140, then station 110 may terminate the IP configuration process and continue to use the current IP configuration parameters.

In yet another design, station 110 may send an ARP Request containing the IP address of DHCP server 140 after performing handoff to new access point 122. If station 110 receives an ARP Reply from DHCP server 140, then station 110 can ascertain that it has not moved into a new subnet and may thus continue to use the current IP configuration parameters. Station 110 may exchange data using the current IP configuration parameters during the ARP process.

Figure 7:
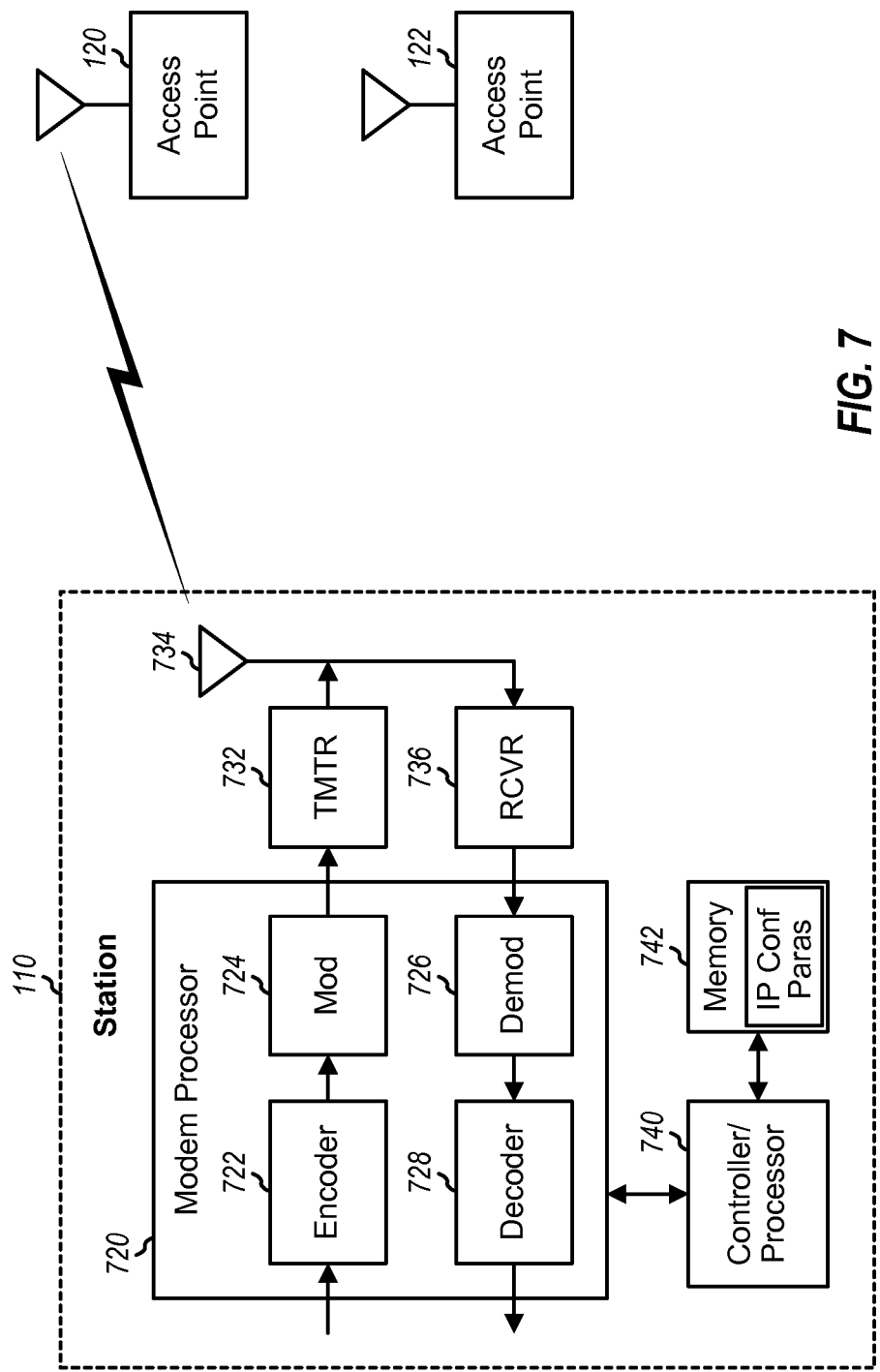
FIG. 7 shows a block diagram of the station.

FIG. 7 shows a block diagram of a design of station 110. On the transmit path, data to be sent by station 110 may be processed (e.g., formatted, encoded, and interleaved) by an encoder 722 and further processed (e.g., modulated and scrambled) by a modulator (Mod) 724 to generate output chips. The processing by encoder 722 and modulator 724 may be dependent on the radio technology (e.g., 802.11) for the WLAN with which station 110 is communicating. A transmitter (TMTR) 732 may condition (e.g., convert to analog, filter, amplify, and frequency upconvert) the output chips and generate a radio frequency (RF) output signal, which may be transmitted via an antenna 734.

On the receive path, RF signals transmitted by access points in the WLAN may be received by antenna 734 and provided to a receiver (RCVR) 736. Receiver 736 may condition (e.g., filter, amplify, frequency downconvert, and digitize) the received RF signal and provide samples. A demodulator (Demod) 726 may process (e.g., descramble and demodulate) the samples to obtain symbol estimates. A decoder 728 may process (e.g., deinterleave and decode) the symbol estimates to obtain decoded data. In general, the processing by station 110 may be complementary to the processing by the access points. Encoder 722, modulator 724, demodulator 726 and decoder 728 may be implemented by a modem processor 720.

A controller/processor 740 may direct the operation of various processing units at station 110. Controller/processor 740 may implement or direct process 600 in FIG. 6, message flow 400 in FIG. 4, message flow 500 in FIG. 5, and/or other processes and message flows to support communication for station 110. Memory 742 may store program codes and data for station 110. Memory 742 may also store IP configuration parameters (IP Conf Paras) and/or other information to support communication for station 110.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 742 in FIG. 7) and executed by a processor (e.g., processor 740). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A mobile station comprising:
   at least one processor configured to:
      obtain a first set of Internet protocol (IP) configuration parameters;
      establish a session based on the first set of IP configuration parameters via a first access point;

receive, using one or more applications, data from a source terminal during the session, wherein the data is received via the first access point;

perform a handoff from the first access point to a second access point; and perform IP configuration, concurrently with receiving the data from the source terminal via the second access point, to obtain a second set of IP configuration parameters for the second access point; and a memory coupled to the at least one processor, wherein the at least one processor enables the one or more applications to continue receiving the data from the source terminal via the second access point during the session based on the first set of IP configuration parameters.

2. The mobile station of claim 1, wherein the at least one processor is further configured to perform the IP configuration after associating with the first access point to obtain the first set of IP configuration parameters.

3. The mobile station of claim 1, wherein the at least one processor is further configured to:
receives a host IP address from the first set of IP configuration parameters; and
requests the host IP address when performing the IP configuration after the handoff.

4. The mobile station of claim 1, wherein the at least one processor is further configured to:
perform the IP configuration via dynamic host configuration protocol (DHCP);
broadcast a DHCPDISCOVER message; and
listen for a DHCPOFFER message.

5. The mobile station of claim 4, wherein the at least one processor is further configured to:
obtain the first set of IP configuration parameters from a DHCP server;
obtain a server IP address from the DHCPOFFER message; and
terminate the IP configuration when the server IP address matches an IP address of the DHCP server.

6. The mobile station of claim 1, wherein the at least one processor is further configured to:
obtain the first set of IP configuration parameters from a dynamic host configuration protocol (DHCP) server;
determine whether the second access point is served by the DHCP server; and
skip performing the IP configuration after the handoff when the second access point is served by the DHCP server.

7. The mobile station of claim 6, wherein the at least one processor is further configured to:
broadcast an address resolution protocol (ARP) request containing an IP address of the DHCP server after the handoff to the second access point; and
skip performing the IP configuration when an ARP reply is received from the DHCP server.

8. The mobile station of claim 7, wherein the at least one processor is further configured to continue to receive the data based on the first set of IP configuration parameters via the second access point after broadcasting the ARP request.

9. The mobile station of claim 1, wherein the at least one processor is further configured to:
determine that new IP configuration parameters are not obtained from the IP configuration after the handoff; and
continue to receive the data based on the first set of IP configuration parameters via the second access point after completing the IP configuration.

10. The mobile station of claim 1, wherein the at least one processor is further configured to:

receive the second set of IP configuration parameters from the IP configuration after the handoff; and
receive the data based on the second set of IP configuration parameters via the second access point after completing the IP configuration.

11. The mobile station of claim 1, wherein the at least one processor is further configured to:
receive the second set of IP configuration parameters from the IP configuration after the handoff;
open a new connection with an IP address obtained from the second set of IP configuration parameters; and
receive the data via the new connection.

12. The mobile station of claim 1, wherein the first set of IP configuration parameters comprises a host IP address, a gateway IP address, a subnet mask, or a combination thereof.

13. A method comprising:
obtaining, at a mobile station, a first set of Internet protocol (IP) configuration parameters;
establishing a session based on the first set of IP configuration parameters via a first access point;
receiving, using one or more applications, data from a source terminal during the session, wherein the data is received via the first access point;
performing a handoff from the first access point to a second access point;
continuing to receive the data from the source terminal via the second access point during the session based on the first set of IP configuration parameters; and
performing IP configuration, concurrently with receiving the data from the source terminal via the second access point, to obtain a second set of IP configuration parameters for the second access point.

14. The method of claim 13, further comprising:
receiving a host IP address from the first set of IP configuration parameters; and
requesting for the host IP address when performing the IP configuration after the handoff.

15. The method of claim 13, wherein the performing IP configuration after the handoff comprises:
performing the IP configuration via dynamic host configuration protocol (DHCP);
broadcasting a DHCPDISCOVER message; and
listening for a DHCPOFFER message from a DHCP server.

16. The method of claim 13, further comprising:
determining that new IP configuration parameters are not obtained from the IP configuration after the handoff; and
continuing to receive the data based on the first set of IP configuration parameters via the second access point after completing the IP configuration.

17. The method of claim 13, further comprising:
receiving the second set of IP configuration parameters from the IP configuration after the handoff; and
receiving the data based on the second set of IP configuration parameters via the second access point after completing the IP configuration.

18. A mobile station comprising:
means for obtaining a first set of Internet protocol (IP) configuration parameters;
means for establishing a session via a first access point based on the first set of IP configuration parameters;
means for receiving, using one or more applications, data from a source terminal during the session, wherein the data is received via the first access point;
means for performing a handoff from the first access point to a second access point, wherein the means for receiving data continues to receive the data from the source terminal via the second access point during the session based on the first set of IP configuration parameters; and means for performing IP configuration, concurrently with the means for receiving data continuing to receive the data from the source terminal via the second access point, to obtain a second set of IP configuration parameters for the second access point.

19. The mobile station of claim 18, further comprising:

means for receiving a host IP address from the first set of IP configuration parameters; and means for requesting for the host IP address when performing IP configuration after the handoff.

20. The mobile station of claim 18, wherein the means for performing IP configuration comprises:

means for performing IP configuration via dynamic host configuration protocol (DHCP);

means for broadcasting a DHCPDISCOVER message; and means for listening for a DHCPOFFER message from a DHCP server.

21. The mobile station of claim 18, further comprising:

means for determining that new IP configuration parameters are not obtained from the IP configuration after the handoff; and means for continuing to receive the data based on the first set of IP configuration parameters via the second access point after completing the IP configuration.

22. The mobile station of claim 18, further comprising:

means for receiving the second set of IP configuration parameters from the IP configuration after the handoff; and means for receiving the data based on the second set of IP configuration parameters via the second access point after completing the IP configuration.

23. A non-transitory processor-readable medium comprising instructions that, when executed by a processor, cause the processor to:

obtain, at a mobile station, a first set of Internet protocol (IP) configuration parameters;

establish a session based on the first set of IP configuration parameters via a first access point;

receive, using one or more applications, data from a source terminal during the session, wherein the data is received via the first access point;

perform a handoff from the first access point to a second access point;

continue to receive the data from the source terminal via the second access point during the session based on the first set of IP configuration parameters; and perform IP configuration, concurrently with receiving the data from the source terminal via the second access point, to obtain a second set of IP configuration parameters for the second access point.

24. The non-transitory processor-readable medium of claim 23, further comprising instructions that, when executed by the processor, cause the processor to:

receive a host IP address from the first set of IP configuration parameters; and request for the host IP address when performing IP configuration after the handoff.

25. The non-transitory processor-readable medium of claim 23, further comprising instructions that, when executed by the processor, cause the processor to:

perform IP configuration via dynamic host configuration protocol (DHCP);

broadcast a DHCPDISCOVER message; and listen for a DHCPOFFER message from a DHCP server.

26. The non-transitory processor-readable medium of claim 23, further comprising instructions that, when executed by the processor, cause the processor to:

determine that new IP configuration parameters are not obtained from the IP configuration after the handoff; and continue to use the first set of IP configuration parameters to receive data via the second access point after completing the IP configuration.

27. The non-transitory processor-readable medium of claim 23, further comprising instructions that, when executed by the processor, cause the processor to:

receive the second set of IP configuration parameters from the IP configuration after the handoff; and receive the data based on the second set of IP configuration parameters via the second access point after completing the IP configuration.

28. At least one processor comprising:

a first module to obtain a first set of Internet protocol (IP) configuration parameters;

a second module to establish a session based on the first set of IP configuration parameters via a first access point;

a third module to receive, using one or more applications, data from a source terminal during the session, wherein the data is received via the first access point;

a fourth module to perform a handoff from the first access point to a second access point, wherein the third module continues to receive the data from the source terminal via the second access point during the session based on the first set of IP configuration parameters via the second access point; and a fifth module to perform IP configuration, concurrently with the third module receiving the data from the source terminal via the second access point, to obtain a second set of IP configuration parameters for the second access point.

* * * * *